United States Patent Office 3,474,138
Patented Oct. 21, 1969

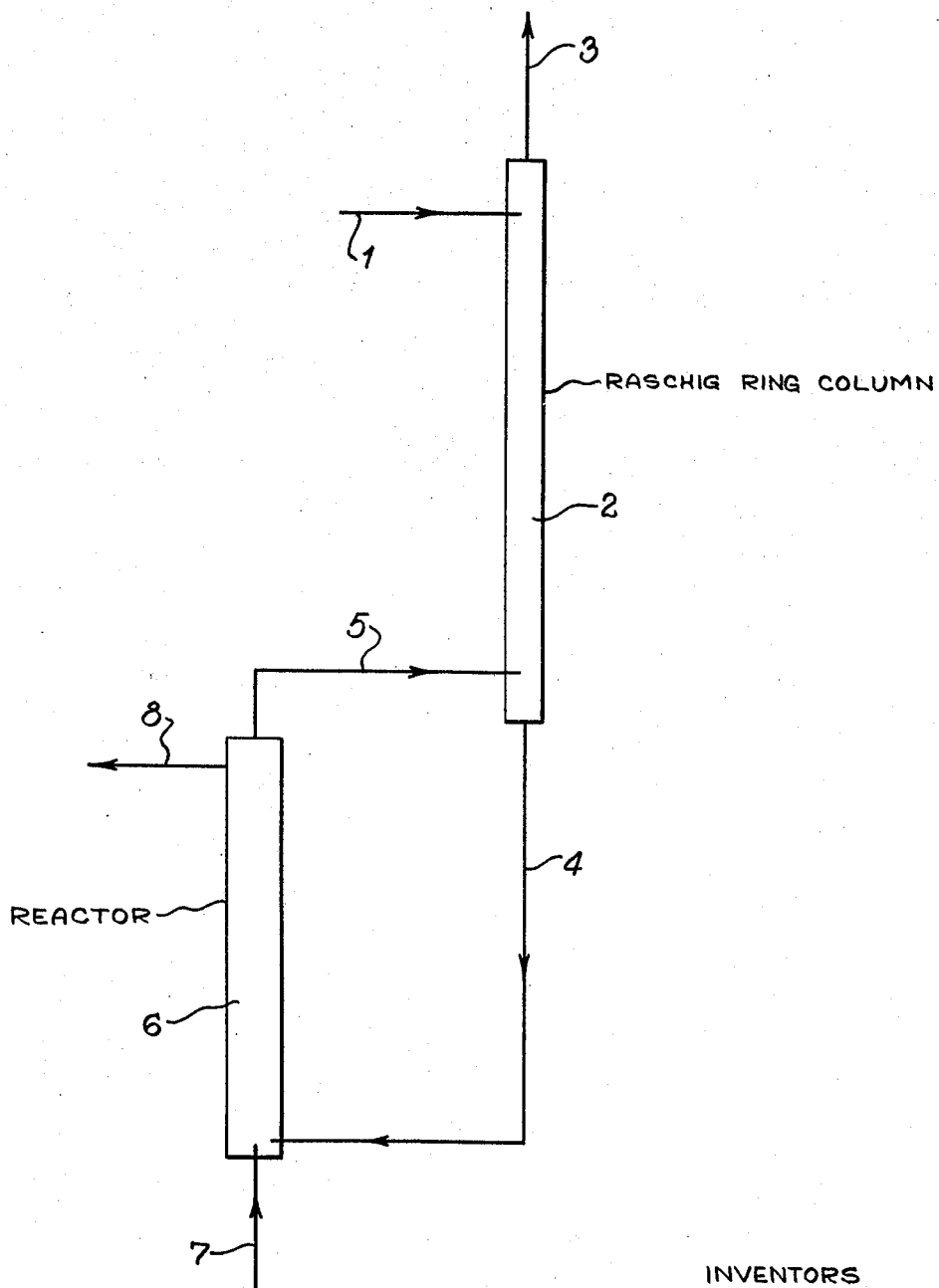

3,474,138
PROCESS FOR MAKING ISOVALERIC ACID
Gerhard Kunstle, Joseph Heckmaier, Fritz Knorr, and Herbert Siegl, Burghausen, Upper Bavaria, Germany, assignors to Wacker-Chemie G.m.b.H., Munich, Bavaria, Germany, a corporation of Germany
Filed Oct. 23, 1967, Ser. No. 677,168
Claims priority, application Germany, Oct. 28, 1966, W 42,691
Int. Cl. C07c 53/22, 51/36
U.S. Cl. 260—540                                                3 Claims

ABSTRACT OF THE DISCLOSURE

This invention relates to producing isovaleric acid, and it has for its object to provide a novel and improved process for this purpose.

Background of the Invention

It is known that by reacting ketene with acetone in the presence of catalysts one obtains $\beta,\beta$-dimethylpropiolactone which can be converted into $\beta,\beta$-dimethyl acrylic acid either as such or via the stage of a polymeric product (see U.S. Patent Nos. 2,382,464, 2,450,116, 2,450,117, 2,450,118, 2,450,134, 2,462,357 and 2,518,662). The latter can be hydrogenated catalytically to form isovaleric acid.

In the conversion of $\beta,\beta$-dimethylpropiolactone, its isolation presents difficulties. Moreover, it can be converted into $\beta,\beta$-dimethyl acrylic acid only by decomposition, during which isobutylene and carbon dioxide are formed.

If the $\beta$-lactone is converted into the acid through the stage of a polymeric intermediate product (U.S. Patent No. 2,361,036) the latter must be performed in a separate work step, or the reaction of ketene with acetone must be performed at a higher reaction temperature (Industrial and Engineering Chemistry, 41; 1949; page 768). While the subsequent polymerization is very hard to control and it can be performed only under simultaneous decarboxylization, a series of by-products are formed during the reaction of ketene with acetone at elevated temperatures. Therefore low yields are obtained in any case.

SUMMARY OF THE INVENTION

We have discovered a process for making isovaleric acid from ketene and acetone which is characterized by the fact that the initial starting materials are converted at temperatures of —50 to 20° C. in the presence of hexafluorophosphoric acid as a catalyst, the catalyst-containing conversion product is converted in the known manner into $\beta,\beta$-dimethyl acrylic acid after removal of the excess acetone, if desired after adding catalytic quantities of inorganic acids of low volatility or alkali or alkaline-earth hydroxides, during which water is excluded, at 10 to 12 torr and at temperatures of 100 to 140° C. and the resulting distillate is catalytically hydrogenated in the known manner. Here it is advantageous to perform the reaction at —15 to 2° C. and dosaging the hexafluorophosphoric acid in quantities of 0.01 to 0.2%, preferably 0.03 to 0.05%, referred to the acetone used.

DESCRIPTION OF THE PREFERRED EMBODIMENTS

In carrying out the process it is necessary to use acetone as free from water as possible, because otherwise trouble arises through inactivation of the catalyst and one obtains a reaction product of which only a small part can be converted into $\beta,\beta$-dimethyl acrylic acid. It is expedient to use technical acetone which has been dried subsequently with molecular screens.

In order to achieve a good assimilation of ketene an acetone excess of about 50% of theory is sufficient. However, it may be higher or lower, depending on the reaction conditions and the procedural technique used.

During the continuous performance of the process the necessary staying period is inversely proportional to the reaction temperature, the catalyst concentration and the acetone excess used, and it can vary within wide limits. Preferably, however, the staying period should not be less than a minimum of about 5 hours.

Usually a technically pure ketene (degree of purity 85 to 88%) is used in carrying out the process of our invention. The ketene is piped into the lower part of a coolable reactor into which the acetone containing the hexafluorophosphoric acid is piped at the same time from below. It is advantageous to add the hexafluorophosphoric acid to the acetone only immediately before the transformation, because prolonged contact periods between hexafluorophosphoric acid and acetone in the absence of ketene has a detrimental effect on the quality of the reaction product and the yield.

It is also possible to react ketene with catalyst-containing acetone in counter-current flow. In such case ketene is piped from below into a Raschig ring column and acetone is piped in from above, and the circulating cooled reaction mixture is separated to form a partial stream for further processing.

During the continuous or discontinuous further processing of the reaction product the excess acetone, if any, can be removed first at normal pressure, then at 20 to 12 torr from the reaction product. The remaining catalyst-containing residue has a highly viscous, waxy consistency.

The remaining, catalyst-containing residue is subsequently heated at 12 to 10 torr, with the exclusion of moisture, to a temperature of 100 to 140° C. One obtains as a distillate with a high yield—pure $\beta,\beta$-dimethyl acrylic acid. To increase the reaction speed one can add to the catalyst-containing residue before heating—small quantities of inorganic acids of low volatility (e.g. phosphoric acid or polyphosphoric acid) or alkali or alkaline-earth hydroxides (e.g. caustic soda or calcium hydroxide).

The catalytic hydrogenation of the $\beta,\beta$-dimethyl acrylic acid can be carried out in various known ways. The hydrogenation catalyst, the solvent, the reaction temperature and the hydrogen pressure can be varied within wide limits. The hydrogenation of the melt or of the aqueous solution of the sodium salt is also possible.

The accompanying drawing is a diagrammatic illustration of a system for carrying out the process of the invention, and is described in detail in the second of the following examples.

EXAMPLE 1

The apparatus used consists of a polyethylene tube 150 cm. long, whose inside diameter is 3 cm., and which is equipped with a cooling jacket. At the lower end of the tube is a gas input frit. The upper end discharges into an intensive cooler whose temperature is set at —15° C.

A freshly made mixture consisting of 625 g. water-free acetone, and 0.19 g. hexafluorophosphoric acid is placed in first. Into this mixture one introduces at 0° C. in the course of 6 hours a total of 228 g. ketene in the form of a technical ketene gas about 88% pure. The residual gas leaving the apparatus at the top is almost free of ketene.

The excess acetone from the resulting reaction solution is removed first at normal pressure, later at about 12 torr. The remainder is 479 g. of a yellowish wax-like reaction product which has a molecular weight of 4000–5000. The yield is 88.2% of theory, referred to the ketene used.

300 g. of this reaction product are heated together with 3 g. concentrated phosphoric acid in a retort equipped with a riser tube, at 11 torr to 120 to 140° C. In the course of 2.5 hours 297 g. of β,β-dimethyl acrylic acid are distilled off through the riser tube. The same result is obtained if one adds 3 g. caustic soda instead of the phosphoric acid and then proceeds as indicated above.

However, if the reaction product, as stated above, is heated in the absence of a low-volatile inorganic acid or of an alkali or alkaline-earth hydroxide, β,β-dimethyl acrylic acid is obtained only after 5 hours, but with the same yield.

297 g. of the resulting β,β-dimethyl acrylic acid are hydrogenated at 70° C. in the presence of platinum dioxide as a hydrogenation catalyst at normal pressure, a quantitative takeup of hydrogen taking place quickly. The hydrogenation product is subsequently filtered and distilled at 11 torr. The yield is 274.5 g. of pure isovaleric acid, or 90.3% referred to the β,β-dimethyl acrylic acid used.

The same result is obtained when one converts the β,β-dimethyl acrylic acid into its sodium salt, hydrogenates the latter thoroughly in an aqueous solution in the presence of Raney nickel as hydrogenation catalyst at normal pressure, acidifies the hydrogenation product with mineral acid, separates the organic layer and processes it by distilling as stated above.

EXAMPLE 2

The apparatus used, as shown in the drawing, consists of a coolable Raschig ring column 2 and a reactor 6, equipped with a cooling jacket, which has a gas input frit on the bottom. The proportion of the diameter of the reactor 6 to its height is 1:15, that of the Raschig ring column 2 to its height 1:43.

Through conduit 1 one pipes into the upper end of column 2 hourly a mixture consisting of 0.05 weight parts hexafluorophosphoric acid and 101.8 parts acetone, while column 2 is kept at a temperature of 5° C. The runoff obtained at the lower end of column 2 is piped into the bottom of reactor through pipe 4. At the same time 42 weight parts of gaseous ketene are piped into reactor 6 through pipe 7. The reactor temperature is kept at 2° C. While the reactor exhaust gas escapes at the top end of reactor 6 through pipe 5 and is introduced into the lower part of column 2, there are obtained at the same time at the upper end of reactor 6, with the aid of the overflow pipe 8, 143.8 weight parts hourly of the reaction mixture.

The further processing of the reaction mixture is done as in Example 1.

From each 143.8 weight parts of reaction mixture one obtains 88.8 weight parts of acetone-free catalyst-containing reaction product. This yields 85.2 weight parts of β,β-dimethyl acrylic acid. From this one obtains 78.7 weight parts isovaleric acid, or 77.1% referred to the ketene used.

The invention claimed is:
1. Process for making isovaleric acid which comprises reacting ketene and acetone at temperatures of −50 to 20° C. in the presence of hexafluorophosphoric acid as a catalyst, removing excess acetone from the catalyst-containing reaction product, converting said reaction product into β,β-dimethyl acrylic acid at 10 to 12 torr and at temperatures of 100 to 140° C. in the absence of water, and hydrogenating the β,β-dimethyl acrylic acid to form isovaleric acid.

2. Process according to claim 1, characterized by the fact that the reaction between the ketene and the acetone is carried out at a temperature of −15 to 2° C.

3. Process according to claim 1, characterized by the fact that said hexafluorophosphoric acid is used in quantities of 0.01 to 0.2% referred to the acetone used.

References Cited
UNITED STATES PATENTS

| | | | |
|---|---|---|---|
| 2,585,223 | 2/1952 | Caldwell | 260—526 |
| 2,568,636 | 9/1951 | Japs | 260—526 |
| 2,739,158 | 3/1956 | Caldwell | 260—343.9 |
| 3,176,042 | 3/1965 | Schnizer et al. | 260—526 |

FOREIGN PATENTS 490,615  2/1953  Canada.

JAMES A. PATTEN, Primary Examiner

V. GARNER, Assistant Examiner

U.S. Cl. X.R.

260—63, 526